UNITED STATES PATENT OFFICE.

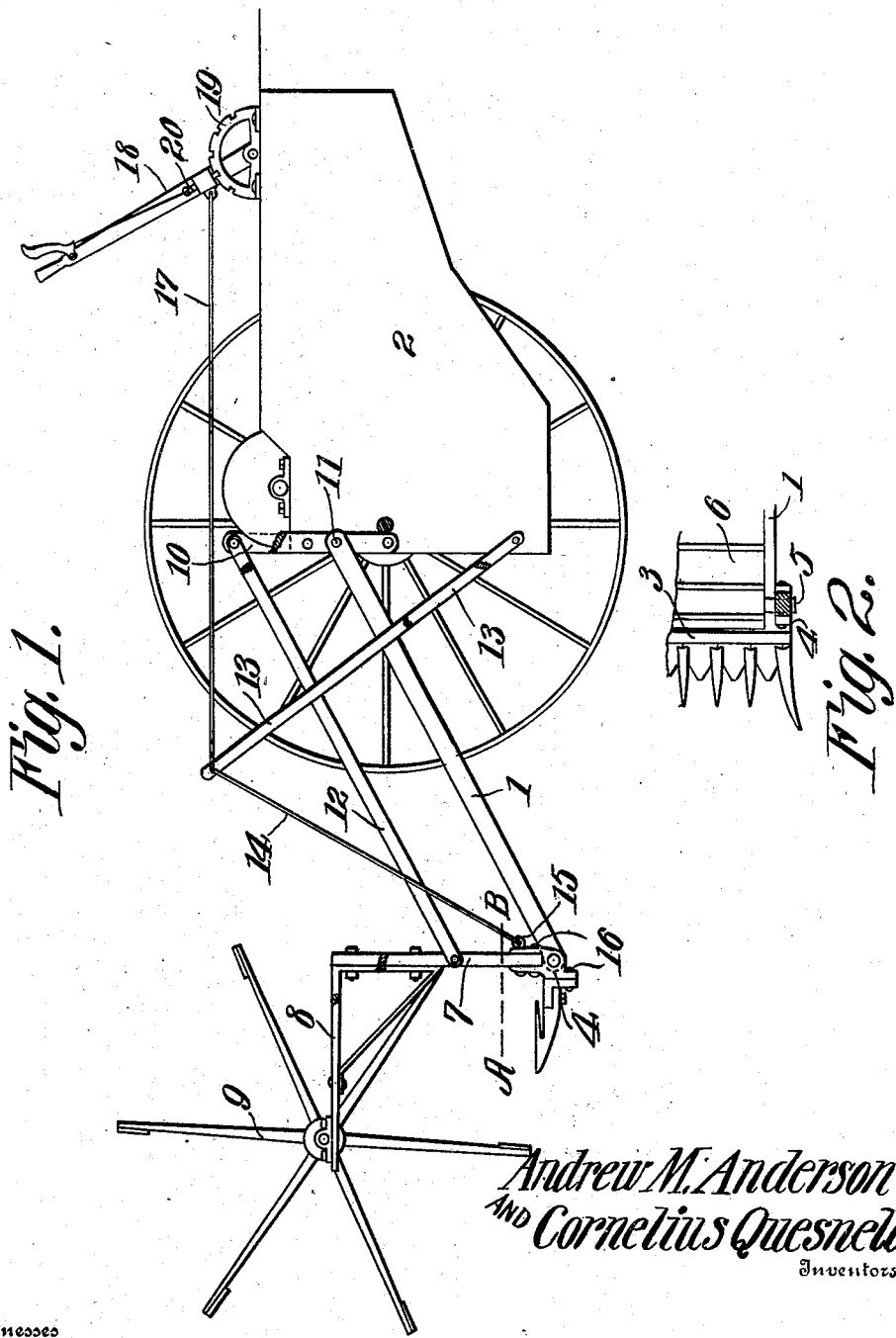

ANDREW M. ANDERSON AND CORNELIUS QUESNELL, OF MOSCOW, IDAHO, ASSIGNORS TO IDAHO NATIONAL HARVESTER COMPANY, OF MOSCOW, IDAHO.

HARVESTER.

No. 920,001.          Specification of Letters Patent.          Patented April 27, 1909.

Application filed May 7, 1908. Serial No. 431,452.

*To all whom it may concern:*

Be it known that we, ANDREW M. ANDERSON and CORNELIUS QUESNELL, citizens of the United States, residing at Moscow, in the county of Latah and State of Idaho, have invented a new and useful Harvester, of which the following is a specification.

This invention relates to machines for harvesting grain and more particularly to means whereby the cutter bar is maintained level at all times irrespective of any vertical adjustment thereof which may be effected.

The invention is more particularly designed for use in connection with harvesting machines of that type in which the cutter bar and the draper for conveying cut grain to threshing mechanism is mounted for vertical adjustment.

One of the objects of the present invention is to provide a cutter bar which will automatically maintain a fixed position relative to the horizontal irrespective of the vertical adjustment of the cutter bar and draper.

Another object is to provide a reel and cutter bar which are so connected as to be maintained constantly in the same relation irrespective of any vertical adjustment of the cutter bar.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of a portion of a machine embodying the present improvements, one wheel being removed and parts of the mechanism broken away. Fig. 2 is a section on line A—B, Fig. 1 said section being taken through one side of the machine.

Referring to the figures by characters of reference, 1 designates the draper or conveyer platform which is pivotally connected at its upper end to the body 2 of the machine. The finger bar 3 of the machine has arms 4 extending rearwardly from its ends and pivotally connected to the lower end of the platform 1, the shaft 5 of the lower roller of the draper 6 preferably constituting the pivot of the arms. Each arm has standards 7 upstanding therefrom directly above its pivots and these arms have forwardly projecting extensions 8 suitably braced and carrying a reel 9 of any desired structure. Standards 10 are secured upon the front portion of the body 2 directly above the rear pivots 11 of the draper platform, and pivotally connected to these standards and to the standards 7 are bars 12 arranged above and parallel with the sides of the platform 1. Levers 13 are pivotally connected to the sides of the body 1 at the front end thereof and have cables 14 extending from their upper ends and downward to eyes 15 extending rearwardy from the standards 7. As shown in Fig. 1 these eyes may extend from ears 16 extending upwardly from the arms 4 and which are fastened to the standards 7 in any preferred manner. Cables 17 are attached to the upper ends of the levers 13 and extend rearwardly to suitable operating means such as a lever 18 having means such as a segment 19 and a pawl 20 for locking it in adjusted position. It is of course to be understood that in lieu of providing the specific means shown in the drawings for adjusting the platform 1 any other desired mechanism may be utilized.

When the machine is being propelled forward the operator, by manipulating the lever 18, can swing the levers 13 and thus cause the cables 14 to raise or lower the platform 1. As this platform, the bars 12 and standards 7 and 10 form parallelograms it will be obvious that the finger bar 3 will be maintained at all times in a fixed relation to the horizontal. Moreover, as the reel is connected to and moves with the finger bar it will obviously be maintained constantly in fixed relation thereto. By manipulating the lever 18 the cutting mechanism can be raised or lowered and there is no danger of the finger bar tilting and permitting the grain to slip therefrom nor is there any danger of the sickle bar being so inclined as to operate inefficiently.

What is claimed is:

1. In a harvester the combination with a vertically adjustable draper platform; of a finger bar pivotally connected to and carried by the platform, and means for maintaining said bar in fixed relation to the horizontal irrespective of the adjustment of the platform.

2. In a harvester the combination with a vertically adjustable draper platform; of a finger bar supported by and pivotally connected to the platform, a reel in fixed relation to the finger bar, and means for maintaining the finger bar in fixed relation to the horizontal irrespective of the adjustment of the platform.

3. In a harvester the combination with a draper platform and means for adjusting the same vertically; of a finger bar pivotally connected to the platform, a reel connected to and supported by said bar, and means for maintaining the bar in fixed relation to the horizontal irrespective of the adjustment of the platform.

4. In a harvester a vertically adjustable pivoted finger bar, and means for maintaining said bar in a fixed relation to the horizontal during the adjustment thereof.

5. In a harvester the combination with a vertically adjustable pivoted finger bar; of a reel movable therewith and fixed relatively thereto, and means for maintaining the finger bar and reel in fixed relation to the horizontal during the adjustment thereof.

6. In a harvester the combination with a vertically swinging draper platform; of a finger bar pivotally connected to the platform, a standard upstanding from the finger bar at one end of the platform, a relatively fixed standard at the other end of the platform, and means pivotally connected to the standards and parallel to the platform for maintaining the finger bar in a predetermined relation to the horizontal.

7. In a harvester the combination with a body; of a draper platform pivotally mounted upon the body, a finger bar pivotally connected to one end of the platform, a standard upstanding from said bar and fixedly secured thereto, a standard upstanding from the body adjacent the pivot of the platform, and a bar pivotally connected to the standard and parallel with the platform.

8. In a harvester the combination with a body and a platform pivotally connected thereto and extending therebeyond; of a finger bar pivotally connected to the platform, standards upstanding therefrom and rigidly connected thereto, a reel supported by said standards, and bars pivotally connected to the standards and parallel with the platform, said bars being pivotally connected to an immovable portion of the body.

9. In a harvester the combination with a body, a draper platform, and means for swinging the same vertically; of a finger bar pivotally connected to and supported by the platform, a bar parallel with the platform and extending longitudinally thereof, and separate connections between said bar and the finger bar and body respectively for maintaining the finger bar in a fixed relation to the horizontal during the swinging movement of the platform.

In testimony that we claim the foregoing as our own, we have hereto affixed our signatures in the presence of two witnesses.

ANDREW M. ANDERSON.
CORNELIUS QUESNELL.

Witnesses:
J. M. THOMPSON,
G. P. MIX.